US006900602B1

(12) United States Patent
Hsieh

(10) Patent No.: US 6,900,602 B1
(45) Date of Patent: May 31, 2005

(54) DOOR OPENER ERROR-START PREVENTION DEVICE

(76) Inventor: Chung Hsien Hsieh, No. 25-1, Fen-Liao Road, Linkou Hsiang, Taipei Hsien 244 (TW)

( * ) Notice: Subject to any disclaimer, the term of this patent is extended or adjusted under 35 U.S.C. 154(b) by 0 days.

(21) Appl. No.: 10/735,969

(22) Filed: Dec. 15, 2003

(51) Int. Cl.[7] .................................................. H02K 7/10
(52) U.S. Cl. ........................................ 318/9; 160/368.1
(58) Field of Search ............................... 318/9–15, 280, 318/286; 160/293.1, 309, 310, 368.1

(56) References Cited

U.S. PATENT DOCUMENTS

| | | | | | |
|---|---|---|---|---|---|
| 3,787,725 | A | * | 1/1974 | Lafontaine | 318/491 |
| 4,055,023 | A | * | 10/1977 | Gatland et al. | 49/28 |
| 4,392,392 | A | * | 7/1983 | Perisic et al. | 475/4 |
| 4,706,727 | A | * | 11/1987 | Leivenzon et al. | 160/188 |
| 5,063,316 | A | * | 11/1991 | E-Ming | 310/83 |

* cited by examiner

*Primary Examiner*—Bentsu Ro

(74) *Attorney, Agent, or Firm*—Bucknam and Archer

(57) ABSTRACT

A door opener error-start prevention device, comprising□a door opener machine, an output shaft of which forms a pair of axial sliding slots by means of passing through a central hole, a sliding pin being inserted into the sliding slots, a compression spring in the central hole abutting against the sliding pin; a sprocket assembly which is connected to the output shaft, one end of which comprises a sprocket that synchronously moves with a sprocket of a rolling shaft of a door through a chain, and the other end of which comprises a sleeve, a pair of V-shaped slots being formed in respect to the sliding slots of the output shaft, and respective engaging with both ends of the sliding pin. When the door is jammed with the latch device, due to error-start, rotation of the output of the door opener is hindered, and said sliding pin 27 moves back toward a gradually larger opening, and compresses said swaying plate 30, then a switch device 31 is triggered to switch off an electrical power for said circuit for opening said door, and supplies a reverse current, so as to make said door opener 20 rotate in a reverse direction, and then make the door close and then return back to its original position.

7 Claims, 5 Drawing Sheets

DOOR OPENER ERROR-START PREVENTION DEVICE

BACKGROUND OF THE INVENTION

1. Field of the Invention

This invention relates to a door opener error-start prevention device, and particularly to a device which solves a jammed problem by itself, and which then makes the door opener reverse and then return back to its original position, when a door opener and a latch device are jammed, and rotation of a door opener is hindered, because of error-start.

2. Description of the Prior Art

Referring to FIG. 1, as an example illustration, for all rolling doors or sectional door or doors that move up and down in vertical direction, rolling doors that move in horizontal direction, sectional doors that moves in a manner that is parallel to the ground or other doors that are opened or closed in an electrical operation manner. For safety reason, a conventional door opener is usually provided with a latch device 2 on one side of the rolling door 1, the purpose of which is to avoid being externally enforced opened either by a jack or by other means, after the door is closed. The latch device 2 of the rolling door 1 is locked from outside, after the door is closed. However, the latch device 2 must be unlocked at first, before the switch 3 for the rolling door 1 is switched on. In some cases, users often forget to unlock the latch device 2 before switching on the switch 3 for the rolling door 1. As a result, the rolling door 1 is jammed with the latch pin of the latch device 2, and this will result in switching on safety device and switching off the electrical power. In this case, neither can the rolling door 1 be opened, nor can the latch device 2 be unlocked. The only solution is to eliminate the jammed condition between the rolling door 1 and the latch device 2, i.e., the rolling door 1 must return back to its original loose status, and then the latch device 2 can be unlocked and the switch 3 of the door opener can be switched on again. Therefore, the design of conventional rolling door 1 still has room for improvement.

SUMMARY OF THE INVENTION

In order to solve the jammed problem caused by error-starting of the conventional vertical, horizontal or parallel moving doors, the inventor of the present invention endeavored to think out that the door opener should have the function of self-restoration to avoid the jammed problem caused by the error-start of the door. Therefore, the object of present invention is to provide a door opener error-start prevention device, in which a sensor device senses a backward movement caused by a sliding pin which is radially inserted into an output shaft of the door opener, and then the sensor device switches off the electrical power and temporarily supplies a reverse current, so as to make the door opener rotate in a reverse direction and then make the door return back to its original position.

The above object can be achieved by the door opener error-start prevention device of the present invention, comprising: a base; a door opener, one end of which has a mounting seat mounted on the base, the other end of which accommodates a power unit, and which transmits a power to an end gear; an output shaft, a first end of which has an axially central hole and is mounted at the center of the end gear, a second end of which extends into the base and is mounted in the base, and which is provided with a pair of sliding slots formed by penetrating the central hole; a sprocket assembly which is connected to the second end of the output shaft in a freely rotatable manner, one end of which comprises a sprocket that synchronously moves with a sprocket of a rolling shaft of the door through a chain, and the other end of which is integrally formed with a sleeve, a pair of V-shaped slots being formed, in respect to the sliding slots of the output shaft, in periphery of the sleeve; a sliding pin which is radially inserted into the sliding slots of the output shaft, and both ends of which are installed in the V-shaped slots of the sleeve; a compression spring which passes through and is installed in the central hole of the output shaft, one of which is mounted by means of an fastener, and the other end of which abuts against the sliding pin; a swaying plate which is installed beside of the sliding pin, one end of which is mounted on the base of the door opener, and the other end of which is a free end and can sway freely; a switch device which is installed beside of the free end of the swaying plate.

According to the present invention, the V-shaped slots on the sleeve of the sprocket assembly comprises a large end and a small end, in which the large end forms a gradually larger opening in an opposite direction of the compression spring. Generally speaking, both ends of the sliding pin respectively engages with the small end of the V-shaped slots, so as to drive the sprocket assembly. When the rolling door is jammed with the latch device, due to error-start, and rotation of the output of the door opener cannot drives the sprocket assembly, then torque of output shaft of the door opener will make the sliding pin have a force to resist pressure of the compression spring, and then move back toward the gradually larger opening of the large end of the V-shaped slots; moreover, when the sliding pin moves back, then the sliding pin will compress the swaying plate, and then trigger the switch device for switching off the electrical power for opening the door, and a reverse current is supplied through a prior circuit, so as to make the door opener rotate in a reverse direction, and then make the door return back to its original position. Therefore, the jammed condition can be eliminated, and then the door opener can be re-started again.

A BRIEF DESCRIPTION OF THE DRAWINGS

Figure 2:
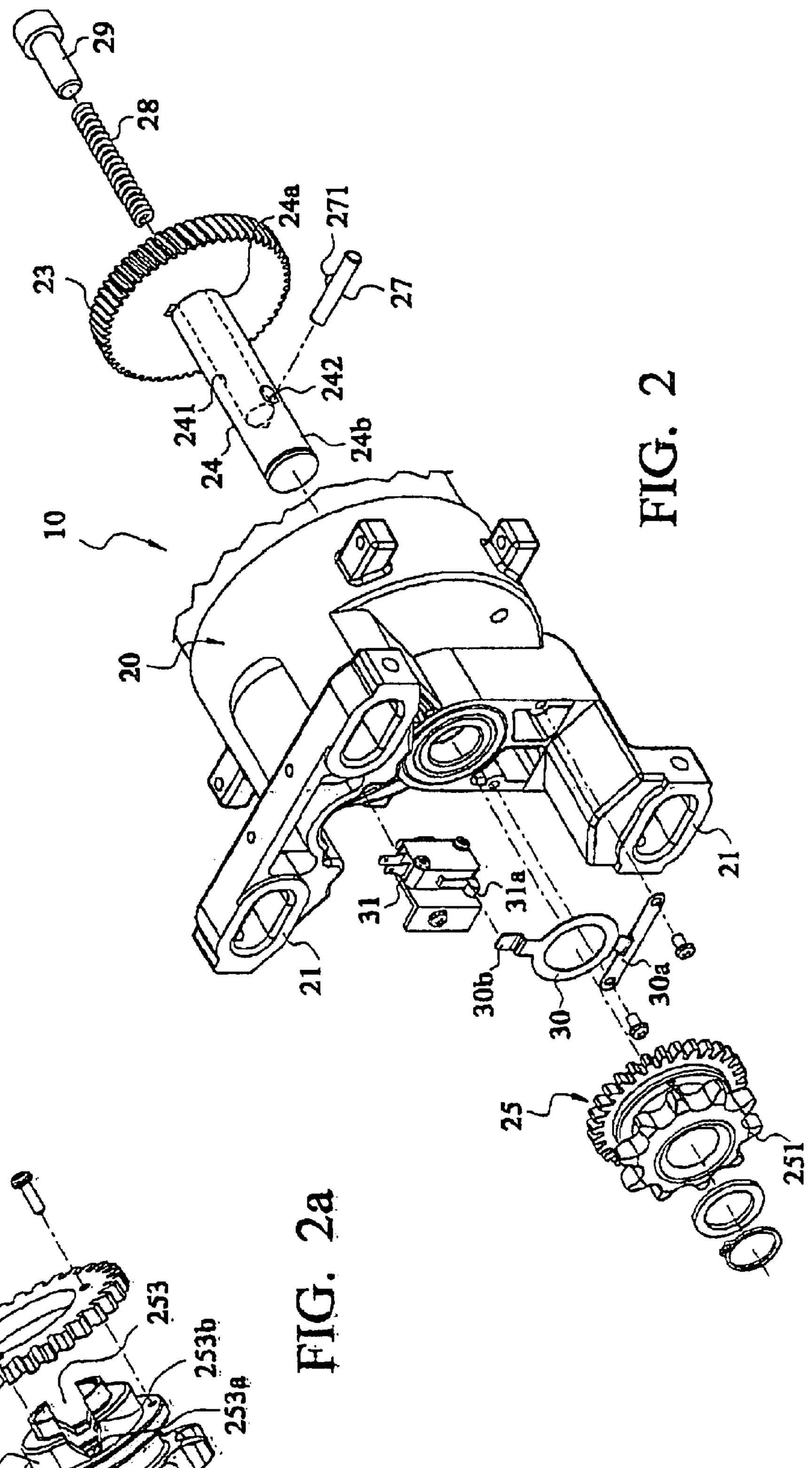
FIG. 2 is a schematic view of an embodiment of the door opener error-start prevention device of the present invention in which some component parts are omitted.
Figure 2A:
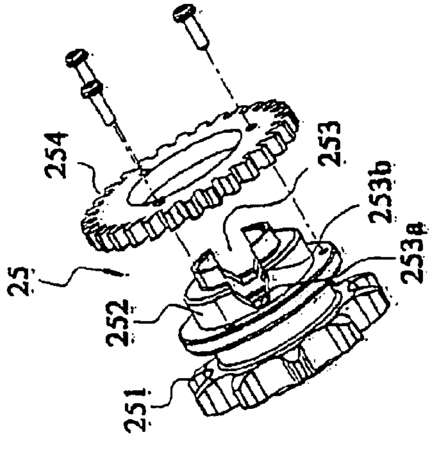
Figure 3:
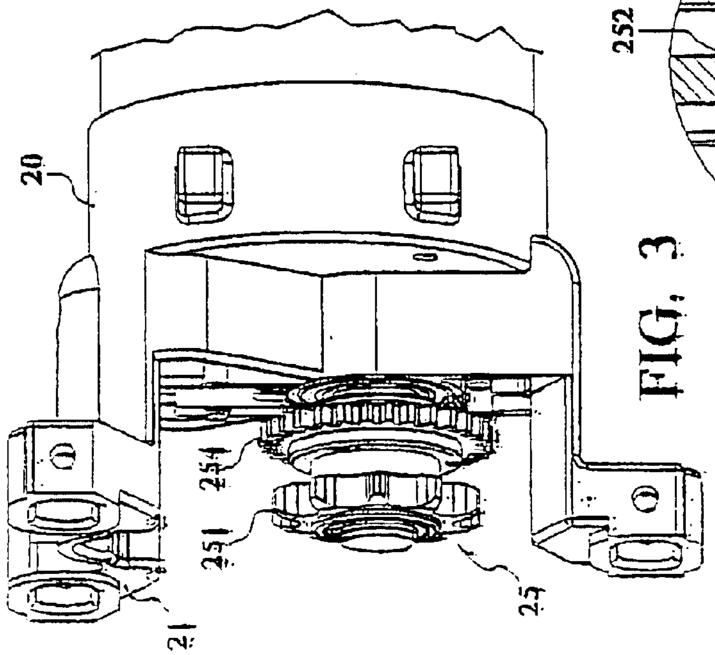

FIG. 2*a* is an another schematic view of a sprocket in the FIG. 2;

FIG. 3 is a perspective view of the embodiment of the FIG. 2 in which some component parts are omitted.

Figure 5:
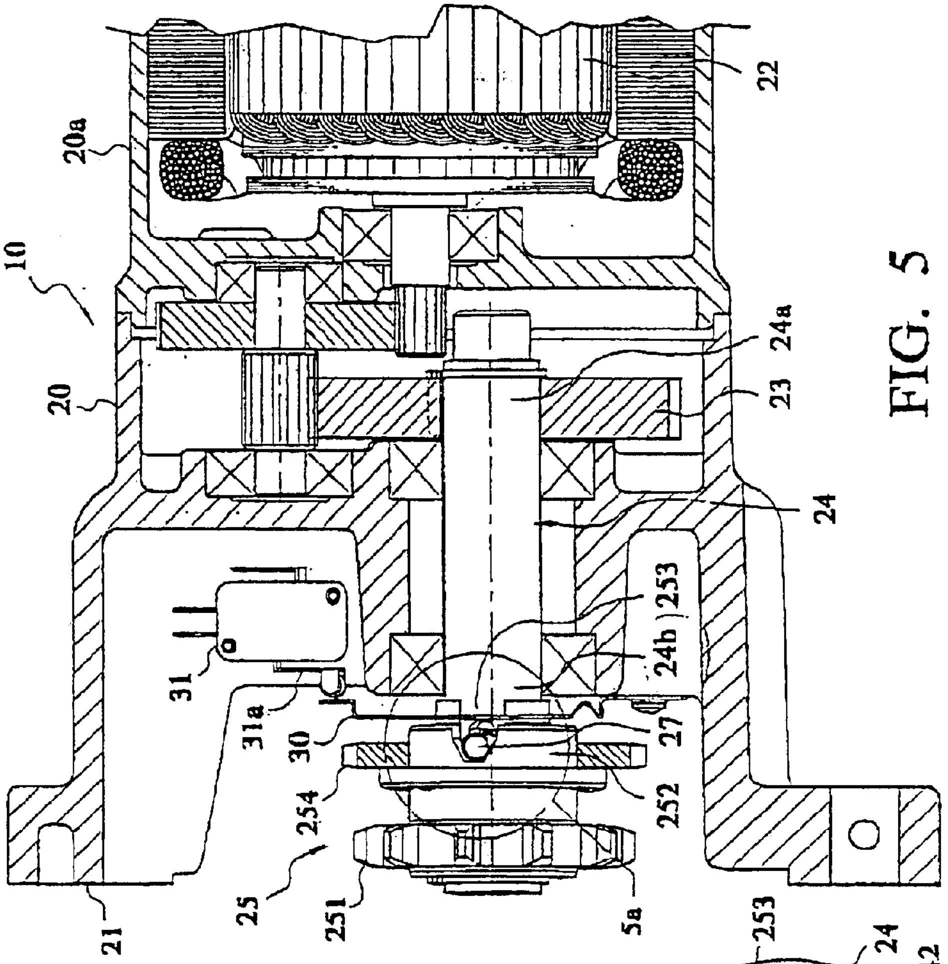
Figure 4:
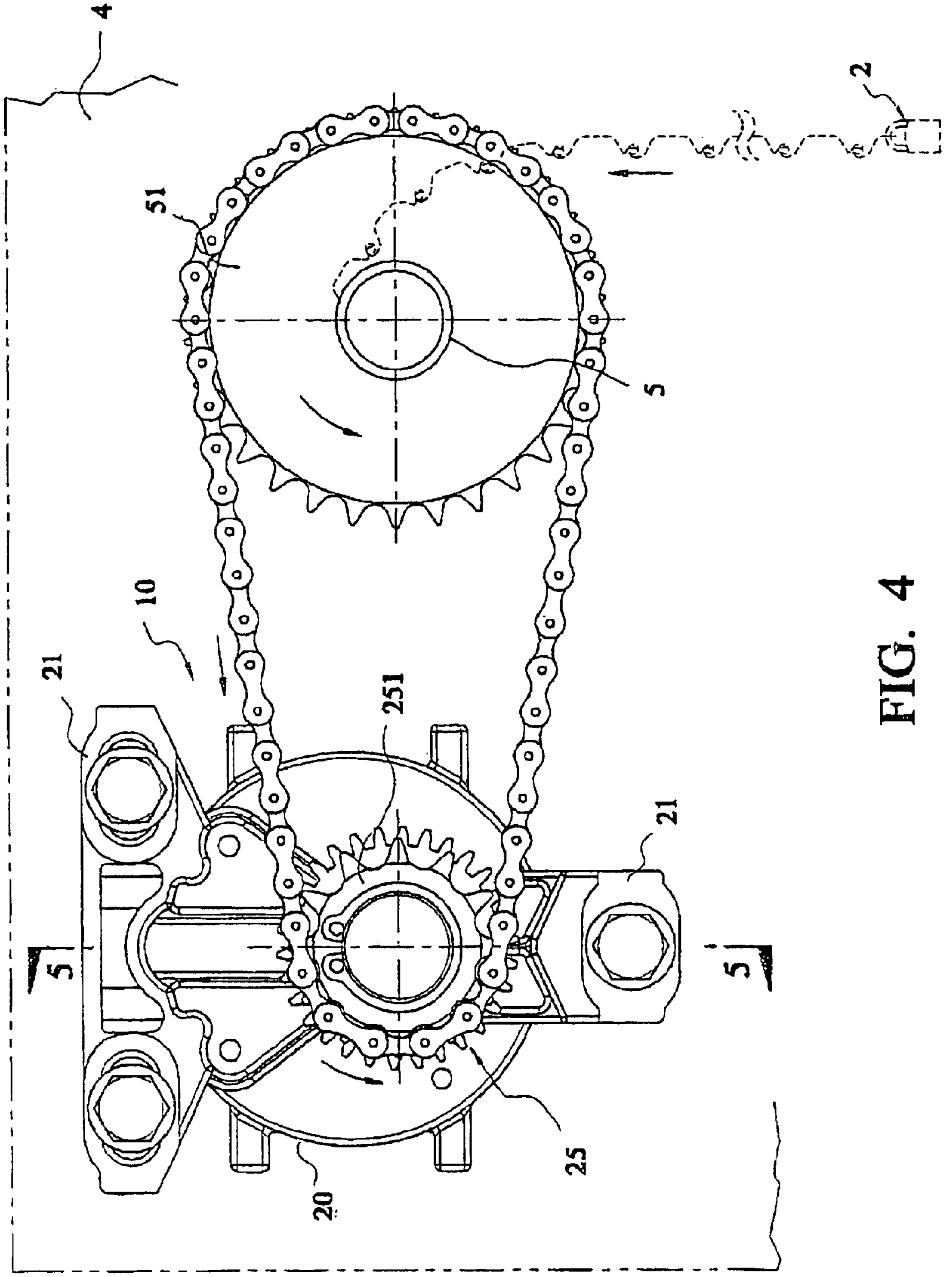

FIG. 4 is a front view of the embodiment of the door opener error-start prevention device of the present invention;

FIG. 5 is a sectional view taken along with 5—5 line in the FIG. 4, in which some component parts are omitted.

Figure 5A:
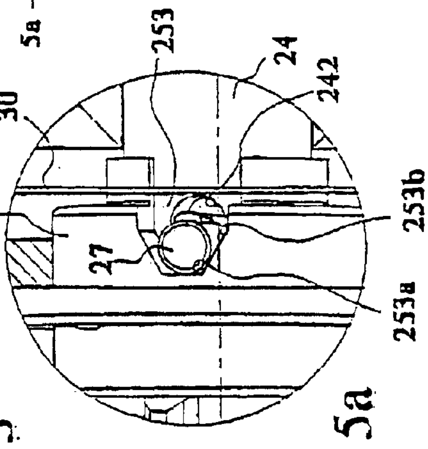
Figures 6, 6A, 7, 7A:
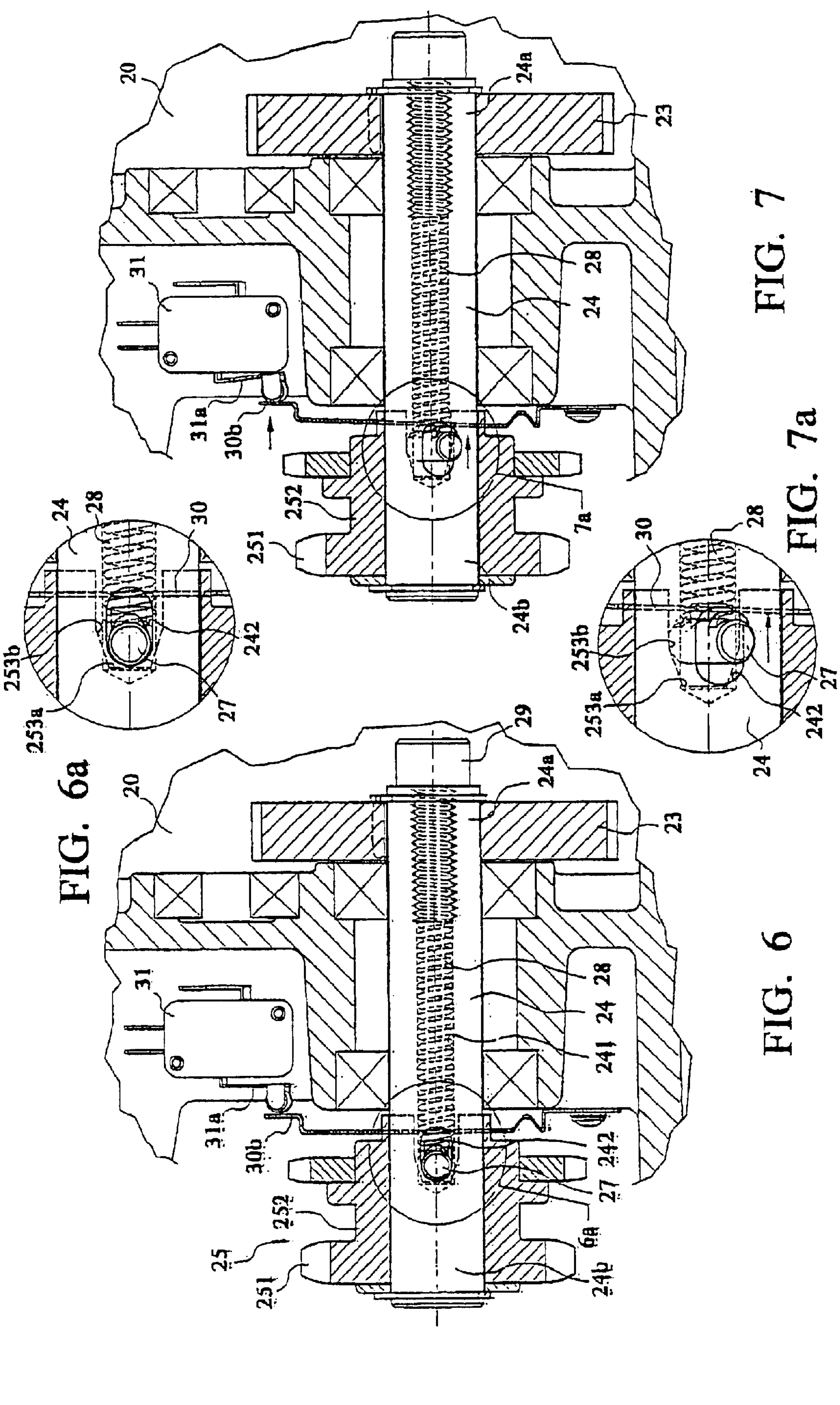

FIG. 5*a* is an enlarged view of 5*a* portion in the FIG. 5;

FIG. 6 is an enlarged view of the FIG. 5, in which a sprocket assembly is sectional and shows that a sliding pin is in a normal drive position;

FIG. 6*a* is an enlarged view of 6*a* portion in the FIG. 6;

FIG. 7 is a view showing a backward movement caused by the sliding movement, when rotation of an output shaft in the FIG. 6 is hindered;

FIG. 7*a* is an enlarged view of 7*a* portion in the FIG. 7.

DETAILED DESCRIPTION OF THE INVENTION (PREFERRED EMBODIMENTS)

The technological features and advantages of present invention will be further understood with the description of a preferred embodiment of present invention, which is considered to be illustrative purpose only and should not be regarded as limitative, in reference to accompanied drawings.

Figure 1:
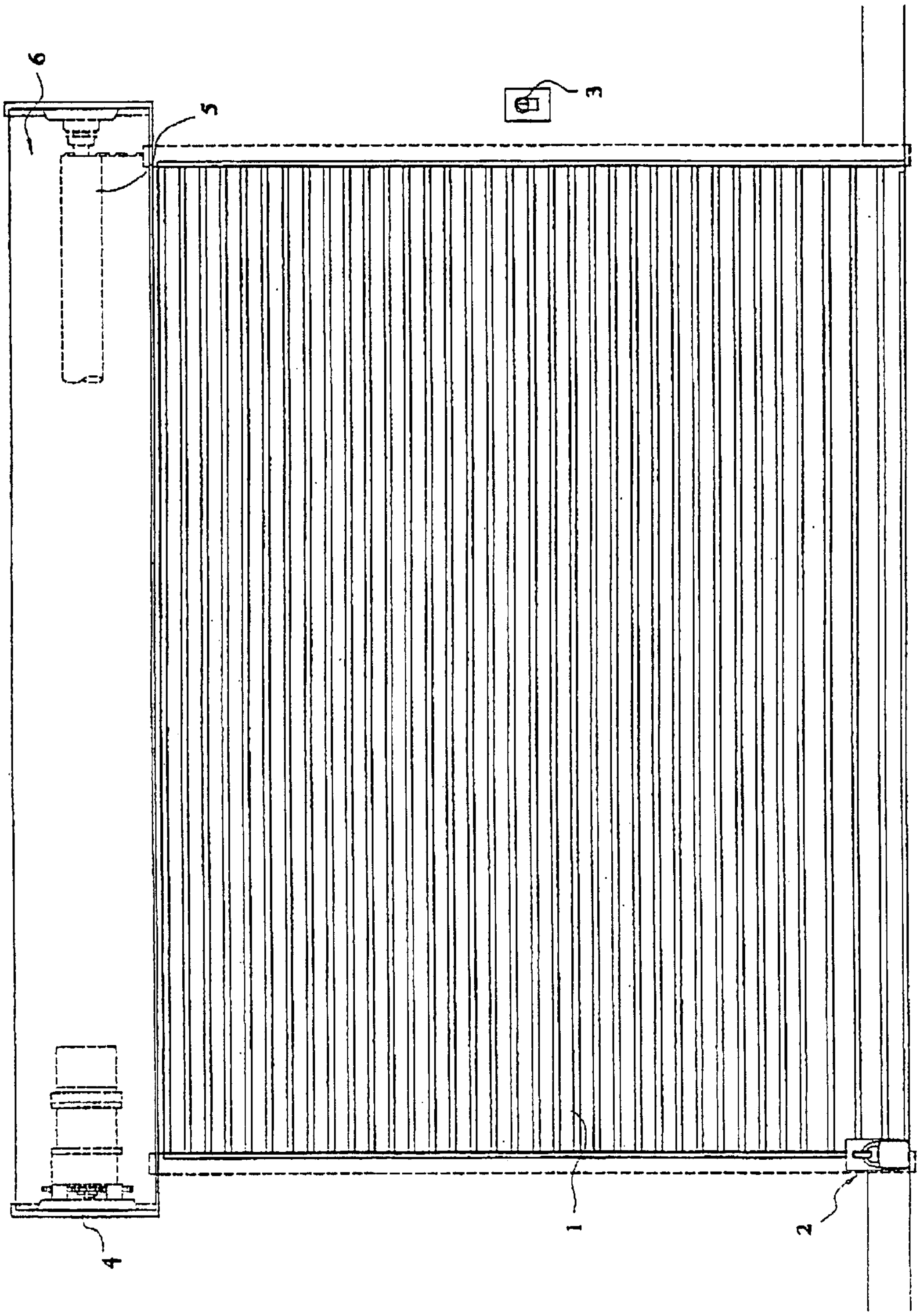
FIG. 1 (PRIOR ART)
FIG. 1 is a schematic view of a conventional rolling door.

First, referring to FIGS. 2 to 5, a door opener error-start prevention device 10 of the present invention comprises:

- a base 4 which is provided at a lateral side of an accommodating chamber 6 of an upper-side rolling shaft 5 of a rolling door 1 (the same as reference numerals of a conventional door opener as shown in FIG. 1);
- a door opener 20 which comprises a housing 20*a*, one end of which has a mounting seat 21 that is mounted on the base 4, and the other end of which accommodates a power unit 22, the power of the power unit being transmitted to an end gear 23 through a gear assembly;
- an output shaft 24, a first end 24*a* of which is mounted at center of the end gear 23, and a second end 24*b* of which extends into the base, and is mounted in the base, the center of the first end 24*a* having an axially central hole 241; moreover, a pair of axial sliding slots 242 being formed in a manner that passes through the central hole 241;
- a sprocket assembly 25 which is connected to the second end 24*b* of the output shaft 24 in a freely rotatable manner, the outer side of the sprocket assembly 25 comprising a sprocket 251, the sprocket assembly 25 synchronously moving with a sprocket 51 on a rolling shaft 5 of the rolling door through a chain 26, an inner side of the sprocket assembly 25 being integrally formed with a sleeve 252, a gear 254 being mounted on the sleeve 252 and synchronously moving with a limitation switch (not shown), a pair of V-shaped slots 253 being formed, in respect to sliding slots 242 on the output shaft 24, in periphery of the sleeve 252;
- a sliding pin 27 which is radially inserted into the sliding slots 242 of the output shaft 24, and both ends of which extend into and are respectively mounted in the pair of V-shaped slots 253 of the sleeve 252, so as to drive the sprocket assembly 25, a positioning bump 271 being formed in the middle of the sliding pin 27 in a vertical direction;
- a spring 28 which passes through and is installed in the central hole 241 of the output shaft 24, one end of which is mounted at a first end 24*a* of the output shaft 24 by a fastener 29, and the other end of which is mounted on the positioning bump 271 of middle of the sliding pin 27, the spring being intended to push the sliding pin 27 toward the second end 24*b;*
- a swaying plate 30 which is installed beside of the sliding pin 27, and is in a position where the swaying plate is not in contact with the sliding pin 27, one end 30*a* of which is mounted on a mounting seat 21 of the door opener 20, and the other end 30*b* of which is a free end and can sway; and
- a switch device 31 which is installed beside the free end 30*b* of the swaying plate 30, and which is used to detect whether the sliding pin 27 is in a normal drive position or not, in which the switch device 31 can be, for example, a touch-type micro switch or an optical-type sensor (not shown); however, in the preferred embodiment of the present invention, only the touch-type micro switch is represented for illustrative purpose.

Referring to FIGS. 6 and 6*a*, according to the present invention, pressure that the compression spring 28 abuts against the sliding pin 27 is selected either based on weight of the door and on strength of the sliding pin 27 for choosing the compression spring 28 having an appropriate pressure, or based on sensitivity by adjusting the pressure of the compression spring 28 through the fastener 29, which compression spring abuts, with a pressure that is in response to weight of the rolling door, against the sliding pin 27. As shown in FIGS. 2*a* and 5*a*, the slots 253 on the sleeve 252 of the sprocket assembly 25 comprises a small end 253*a* in a direction of pressure of the compression spring 28, and comprises a large end 253*b* having a gradually larger opening in an opposite direction of the compression spring 28. Generally, the compression spring 28 pushes the sliding pin 27 toward the second end 24*b* of the output shaft 24, and thus abuts against the small end 253*a* of the slots 253, so as to drive the sprocket assembly 25.

Again, as shown in FIGS. 7 and 7*a*, when the rolling door and the latch device are jammed, because of error-start, and rotation of the output shaft 24 of the door opener 20 cannot drive the sprocket assembly 25, then the torque of the output 24 will make the sliding pin 27 have a force to resist the pressure of the compression spring 28, and then move back toward the gradually larger opening 253*b* of the large end of the slots 253; moreover, when the sliding pin 27 moves back, then the sliding pin 27 will compress the swaying plate 30 for making the free end 30*b* sway, and then trigger an arm 31*a* of the switch device 31 for switching off the electrical power for rising the rolling door. According to the present invention, as shown in a prior circuit, normal close (NC) contact of the switch device 31 is electrically connected to a circuit for opening the door; on the contrary, normal open (NO) contact is electrically connected to a circuit for closing the door. Therefore, when the free end 30*b* of the swaying plate 30 is in contact with the arm 31*a* of the switch device 31, then electrical power for the circuit for opening the door opener is switched off, and a reverse current provided by the prior circuit can make the door opener 20 rotate in the reverse direction, and make the door opener return back to its original position. Therefore, the jammed condition can be eliminated, and then the door opener can be re-started again.

The above-mentioned door opener of the door opener error-start prevention device can be used as the conventional electrical doors, for example, rolling doors or sectional doors that move up and down in vertical direction, rolling doors that move in horizontal direction, sectional doors that moves in a manner that is parallel to the ground, or other doors that is opened or closed by an electrical manner. Therefore, the aforesaid preferred embodiment of the present invention for illustrative purpose only, and it should not be considered as a limitative to present invention. Any equivalent modifications and variations are considered to be within the range of present invention without departing from the spirit and scope of the appended claims.

Based on the foregoing, the door opener error-start prevention device of the present invention has the function of self-restoration even at low cost and at low expenses, even when the door opener is jammed with the latch pin due to error-start. Therefore, this invention is novel in design, and has inventive steps comparing to convention device and potential feasibility in industrial application.

What is claimed is:

1. A door opener error-start prevention device 10, comprising:

- a base 4;
- a door opener 20, one end of which has a mounting seat 21 that is mounted on said base 4, and the other end of which accommodates a power unit 22 for outputting power;

an output shaft 24, a first end 24*a* of which forms, from said end, an axially central hole 241, and is mounted at center of an end gear 23 driven by said power unit 22, a second end 24*b* of which extends into said base, and is installed in said mounting seat 21 in a rotatable manner, and in which a pair of axial sliding slots 242 are formed in a manner that passes through said central hole 241;

a sprocket assembly 25 which is connected to said second end 24*b* of said output shaft 24 in a freely rotatable manner, one end of which comprises a sprocket 251 synchronously moving with a sprocket 51 on a rolling shaft 5 of a rolling door 1 through a chain 26, and the other end of which is integrally formed with a sleeve 252, a pair of V-shaped slots 253 being formed, in respect to sliding slots 242 on said output shaft 24, in periphery of said sleeve 252, a sliding pin 27 being radially inserted into said sliding slots 242 of said output shaft 24, both ends of said sliding pin 27 protruding into said V-shaped slots of said sleeve 252;

a compression spring 28 which passes through and is installed in said central hole 241 of said output shaft 24, one end of which is mounted by means of a fastener 29, and the other end of which abuts against said sliding pin 27;

a swaying plate 30 which is installed beside said sliding pin 27, one end 30*a* of which is mounted on a mounting seat 21 of said door opener 20, and the other end 30*b* of which is a free end; and a switch device 31 which is installed beside said free end 30*b* of said swaying plate 30, in which when rotation of said door opener 20 is hindered, and said sliding pin 27 moves back toward a gradually larger opening, and compresses said swaying plate 30, then a switch device 31 is triggered to switch off an electrical power for said circuit for rising said rolling door, and supplies a reverse current, so as to make said door opener 20 rotate in a reverse direction, and then make door plates descend and then return back to its original position.

2. The door opener error-start prevention device 10 according to claim 1, wherein said slots 253 on said sleeve 252 of said sprocket assembly 25 comprises a small end 253*a* and a large end 253*b*.

3. The door opener error-start prevention device 10 according to claim 2, wherein said large end 253*b* of said slots 253 forms a gradually larger opening in an opposite direction of said compression spring 28.

4. The door opener error-start prevention device 10 according to claim 3, wherein said compression spring 28 having an appropriate pressure is selected based on weight of said door plates and on a strength of said sliding pin 27.

5. The door opener error-start prevention device 10 according to claim 2, wherein a positioning bump 271 is formed in middle of said sliding pin 27 in a vertical direction manner.

6. The door opener error-start prevention device 10 according to claim 1, wherein said switch device 31 is a micro switch 31.

7. The door opener error-start prevention device 10 according to claim 1, wherein the pressure of the compression spring 28 is adjusted, in response to weight of said door plates or the sensitivity, through the fastener 29.

* * * * *